(12) United States Patent
Sakamaki et al.

(10) Patent No.: US 6,244,372 B1
(45) Date of Patent: Jun. 12, 2001

(54) POWER STEERING APPARATUS

(75) Inventors: Masahiko Sakamaki, Yao; Hiroaki Kaji, Yamatokooriyama, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/398,214

(22) Filed: Sep. 17, 1999

(30) Foreign Application Priority Data

Sep. 18, 1998 (JP) .................................................. 10-265215

(51) Int. Cl.$^7$ .................................................. B62D 5/06
(52) U.S. Cl. .................................................. 180/422; 701/41
(58) Field of Search .................................. 180/446, 417, 180/422, 421; 701/41, 42

(56) References Cited

U.S. PATENT DOCUMENTS

| | | | |
|---|---|---|---|
| 4,100,739 | * 7/1978 | Shaffer | 60/413 |
| 4,809,173 | * 2/1989 | Fukami et al. | 364/424.05 |
| 4,986,379 | * 1/1991 | Morishita | 180/79.1 |
| 4,986,381 | * 1/1991 | Morishita et al. | 180/79.1 |
| 5,568,389 | * 10/1996 | McLaughlin et al. | 364/424.05 |
| 5,950,759 | * 9/1999 | Lang et al. | 180/441 |

FOREIGN PATENT DOCUMENTS 59-118577 7/1984 (JP).

* cited by examiner

*Primary Examiner*—Brian L. Johnson
*Assistant Examiner*—Avraham H. Lerner
(74) *Attorney, Agent, or Firm*—Rabin & Champagne, P.C.

(57) ABSTRACT

A power steering apparatus which generates a steering assist force by a hydraulic pressure generated by a pump driven by an electric motor. The power steering apparatus actuates the electric motor in its off state, on condition that a change amount of a steering angle exceeds an actuation threshold. A first actuation threshold which is to be employed when a steering wheel is operated away from a steering angle midpoint and a second actuation threshold which is to be employed when the steering wheel is operated toward the steering angle midpoint are determined in accordance with a sensed steering angle so that the sum of the first and second actuation thresholds is virtually constant.

5 Claims, 9 Drawing Sheets

POWER STEERING APPARATUS

BACKGROUND OF THE INVENTION

1. Field of the Invention

The present invention relates to a power steering apparatus that applies a steering assist force to a steering mechanism by a hydraulic pressure that is generated by a pump driven by an electric motor.

2. Description of Related Art

Power steering apparatuses are known which assist operation of a steering wheel by supplying a working oil from an oil pump to a power cylinder coupled to a steering mechanism. The oil pump is driven by an electric motor, and a steering assist force is generated by the power cylinder in accordance with the rotation speed of the electric motor.

Drive control of the electric motor is performed, for example, on the basis of the steering angle of the steering wheel. That is, the steering angle is determined on the basis of an output of a steering angle sensor provided in association with the steering wheel, and the driving of the electric motor is controlled on the basis of the steering angle thus determined. More specifically, if the steering angle of the steering wheel is within a motor off range defined around a steering angle midpoint, steering assistance is considered to be unnecessary, so that the electric motor is stopped. On the other hand, if the steering angle of the steering wheel is out of the motor off range, the electric motor is actuated to generate a steering assist force.

Determination of the steering angle midpoint is achieved, for example, by sampling steering angle data outputted from the steering angle sensor and regarding the most frequent steering angle data as corresponding to the steering angle midpoint.

In the prior art described above, the electric motor is actuated in response to detection of a steering angle value falling out of the fixedly defined motor off range. If the motor off range is set wider, an entrapped feeling may occur due to a delay in the actuation of the electric motor, so that the steering feeling is deteriorated. Therefore, the motor off range is generally set narrower. However, this makes the actuation of the electric motor more sensitive to the operation of the steering wheel, resulting in a greater energy loss. That is, the electric motor may needlessly be actuated even when the steering is deflected due to traveling on a rough road or the like.

SUMMARY OF THE INVENTION

It is an object of the present invention to provide a power steering apparatus which ensures improved steering feeling for the driver.

It is another object of the present invention to provide a power steering apparatus which features an enhanced energy saving.

The power steering apparatus according to the present invention, which is adapted to generate a steering assist force by a hydraulic pressure generated by a pump driven by an electric motor, comprises: steering angle detection means for sensing a steering angle as measured with respect to a steering angle midpoint; actuation control means for actuating the electric motor in its off state, based on the condition that a change amount of the steering angle sensed by the steering angle detection means exceeds a predetermined actuation threshold; and actuation threshold determining means for determining the actuation threshold in accordance with the steering angle sensed by the steering angle detection means when the electric motor is turned off.

In accordance with one embodiment of the present invention, the actuation threshold determining means determines a first actuation threshold which is to be employed when a steering wheel is operated away from the steering angle midpoint and a second actuation threshold which is employed when the steering wheel is operated toward the steering angle midpoint in accordance with the sensed steering angle so that the sum of the first and second actuation thresholds is virtually constant.

When the steering angle is close to the steering angle midpoint, the steering wheel experiences a substantial amount of change in the steering angle before the steering angle gets out of a play angle range of the steering wheel. That is, when the steering wheel is operated away from the steering angle midpoint, the steering wheel experiences a great amount of change in the steering angle before the steering assist force is required. Where the steering angle is relatively large, conversely, a greater steering assist force is required immediately after the start of the steering operation away from the midpoint.

Where the steering angle is large, a self-alignment force is exerted on a steering mechanism due to a reverse input from wheels to return the steering wheel to the steering angle midpoint. Therefore, the application of the steering assist force is less urgent with a larger steering angle in the steering operation toward the steering midpoint.

In the present invention, the first actuation threshold to be employed for the steering operation away from the midpoint and the second actuation threshold to be employed for the steering operation toward the midpoint are determined in accordance with the steering angle at the deactuation of the electric motor so that the sum (of the absolute values) of the first and second actuation thresholds is virtually constant, and the electric motor is actuated based on the condition that the change amount of the steering angle exceeds the first or second actuation threshold.

Therefore, if the steering angle at the motor deactuation is close to the midpoint, for example, the first actuation threshold for the steering operation away from the midpoint is set at a higher value, and the second actuation threshold for the steering operation toward the midpoint is set at a lower value. On the contrary, if the steering angle at the motor deactuation is relatively large, the first actuation threshold for the steering operation away from the midpoint is set at a lower value, and the second actuation threshold for the steering operation toward the midpoint is set at a higher value.

Thus, the electric motor is not needlessly actuated when the steering angle is close to the steering angle midpoint, and a greater steering assist force can immediately be generated when the steering wheel is operated away from the midpoint at a greater steering angle. For the steering operation toward the midpoint, the actuation threshold is set at a higher value with a greater steering angle, so that power consumption of the electric motor can be reduced by effectively utilizing the self-alignment force. Thus, the enhancement of the energy saving and the improvement of the steering feeling can both be achieved.

The actuation control means may include actuation steering angle calculating means for determining an actuation steering angle at which the electric motor in its off state is to be actuated on the basis of the steering angle sensed by the steering angle detection means and the actuation threshold determined by the actuation threshold determining means, and means for actuating the electric motor in its off state, based on the condition that the steering angle sensed by the steering angle detection means reaches the actuation steering angle determined by the actuation steering angle calculating means.

The actuation threshold determining means is preferably adapted to set the first actuation threshold for the steering operation away from the midpoint at a lower value and the second actuation threshold for the steering operation toward the midpoint at a higher value as the steering angle sensed by the steering angle detection means at the motor deactuation is greater.

The actuation threshold determining means is preferably adapted to set the actuation threshold for the steering operation toward the midpoint at a higher value as the steering angle sensed by the steering angle detection means at the motor deactuation is greater.

In accordance with one embodiment of the present invention, the power steering apparatus further comprises vehicle speed detection means for sensing a vehicle speed, wherein the actuation threshold determining means sets the actuation threshold at a higher value as the vehicle speed sensed by the vehicle speed detection means is higher.

Therefore, the motor is immediately actuated at a low rate of speed, while the motor is actuated less sensitively at high speed traveling. Accordingly, the electric motor is prevented from being needlessly actuated at a high traveling speed at which the steering assist is less necessary, while the steering assist is immediately started at the low traveling speed. Thus, the energy saving and the sense of steering control can both be improved.

The foregoing and other objects, features and effects of the present invention will become more apparent from the following description of the preferred embodiments with reference to the attached drawings.

DESCRIPTION OF THE PREFERRED EMBODIMENTS

Figure 1:
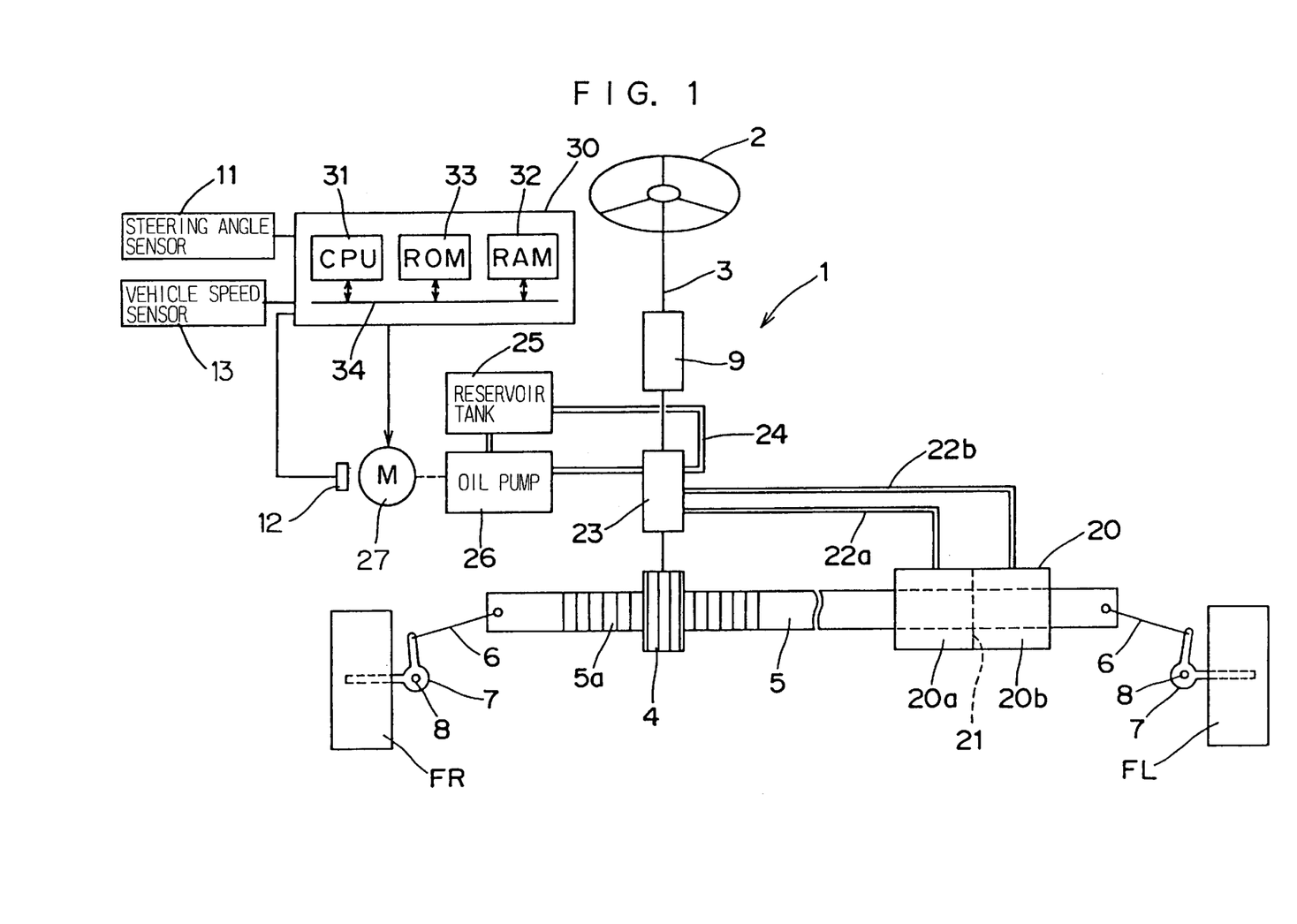
FIG. 1 is a conceptual diagram illustrating the basic construction of a power steering apparatus according to one embodiment of the present invention.

FIG. 1 is a conceptual diagram illustrating the basic construction of a power steering apparatus according to one embodiment of the present invention. This power steering apparatus is provided in association with a steering mechanism 1 of a motor vehicle for applying a steering assist force to the steering mechanism 1.

The steering mechanism 1 includes a steering wheel 2 to be operated by a driver, a steering shaft 3 coupled to the steering wheel 2, a pinion gear 4 provided at a distal end of the steering shaft 3, and a rack shaft 5 having a rack gear 5a meshed with the pinion gear 4 and extending transversely of the motor vehicle. Tie rods 6 are connected to opposite ends of the rack shaft 5, and further connected to knuckle arms 7 which respectively support left and right front wheels FL and FR as steerable wheels. The knuckle arms 7 are respectively provided rotatably about king pins 8.

With this arrangement, when the steering wheel 2 is operated to rotate the steering shaft 3, the rotational motion is converted into a linear motion transverse to the motor vehicle by the pinion gear 4 and the rack shaft 5. The linear motion is converted into rotational motions of the knuckle arms 7 about the king pins 8, thereby achieving the steering of the left and right front wheels FL, FR.

A torsion bar 9 and a hydraulic pressure control valve 23 are incorporated in the steering shaft 3. The torsion bar 9 is adapted to be twisted in accordance with the direction and magnitude of a steering torque applied to the steering wheel 2. The hydraulic pressure control valve 23 is adapted to change its valve aperture in accordance with the direction and magnitude of the torsion of the torsion bar 9. The hydraulic pressure control valve 23 is connected to a power cylinder 20 for applying a steering assist force to the steering mechanism 1. The power cylinder 20 includes a piston 21 provided integrally with the rack shaft 5, and a pair of cylinder chambers 20a and 20b split by the piston 21. The cylinder chambers 20a and 20b are connected to the hydraulic pressure control valve 23 via oil supply/return lines 22a and 22b, respectively.

The hydraulic pressure control valve 23 is interposed in an oil circulation line 24 which extends through a reservoir tank 25 and an oil pump 26. The oil pump 26 is driven by an electric motor 27, so that a working oil contained in the reservoir tank 25 is pumped up and supplied to the hydraulic pressure control valve 23. An excess of the working oil is returned to the reservoir tank 25 from the hydraulic pressure control valve 23 via the oil circulation line 24.

When a torsion is exerted on the torsion bar 9 in one direction, the hydraulic pressure control valve 23 supplies the working oil to one of the cylinder chambers 20a, 20b of the power cylinder 20 via one of the oil supply/return lines 22a, 22b. When a torsion is exerted on the torsion bar 9 in the other direction, the hydraulic pressure control valve supplies the working oil to the other of the cylinder chambers 20a, 20b via the other of the oil supply/return lines 22a, 22b. When virtually no torsion is exerted on the torsion bar 9, the hydraulic pressure control valve 23 is in an equilibrium state, so that the working oil is not supplied to the power cylinder 20 but rather is circulated in the oil circulation line 24.

When the working oil is supplied to either one of the cylinder chambers of the power cylinder 20, the piston 21 moves transversely of the motor vehicle. Thus, a steering assist force acts on the rack shaft 5.

An exemplary construction of the hydraulic pressure control valve is disclosed in detail, for example, in Japanese Unexamined Patent Publication No. 59-118577 (1984) and U.S. patent application Ser. No. 733,644, the disclosure of the latter of which is incorporated herein by reference.

The driving of the motor 27 is controlled by an electronic control unit 30. The electronic control unit 30 is comprised of a microprocessor which includes a CPU 31, a RAM 32 which provides a work area for the CPU 31, a ROM 33 storing therein operation programs for the CPU 31, and buses 34 interconnecting the CPU 31, the RAM 32 and the ROM 33.

The electronic control unit 30 receives steering angle data outputted from a steering angle sensor 11 which is provided in association with the steering wheel 2. The steering angle sensor 11 sets a steering angle of the steering wheel 2 observed when an ignition key switch is actuated for startup of an engine at an initial level "0", and outputs steering angle data which has a value corresponding to a steering angle relative to the initial level and a sign corresponding to a steering direction.

The electronic control unit 30 also receives electric current data applied from an electric current detecting circuit 12 which detects electric current flowing through the motor 27. The electric current data has a value proportional to the value of a consumed electric current of the motor 27 (motor electric current).

Further, the electronic control unit 30 receives vehicle speed data outputted from a vehicle speed sensor 13. The vehicle speed sensor 13 may be adapted to directly sense a vehicle speed or, alternatively, adapted to calculate the vehicle speed on the basis of output pulses of wheel speed sensors provided in association with the wheels.

The electronic control unit 30 controls the driving of the motor 27 on the basis of the steering angle data, the electric current data and the vehicle speed data, which are outputted from the steering angle sensor 11, the electric current detecting circuit 12 and the vehicle speed sensor 13, respectively.

Figure 2:
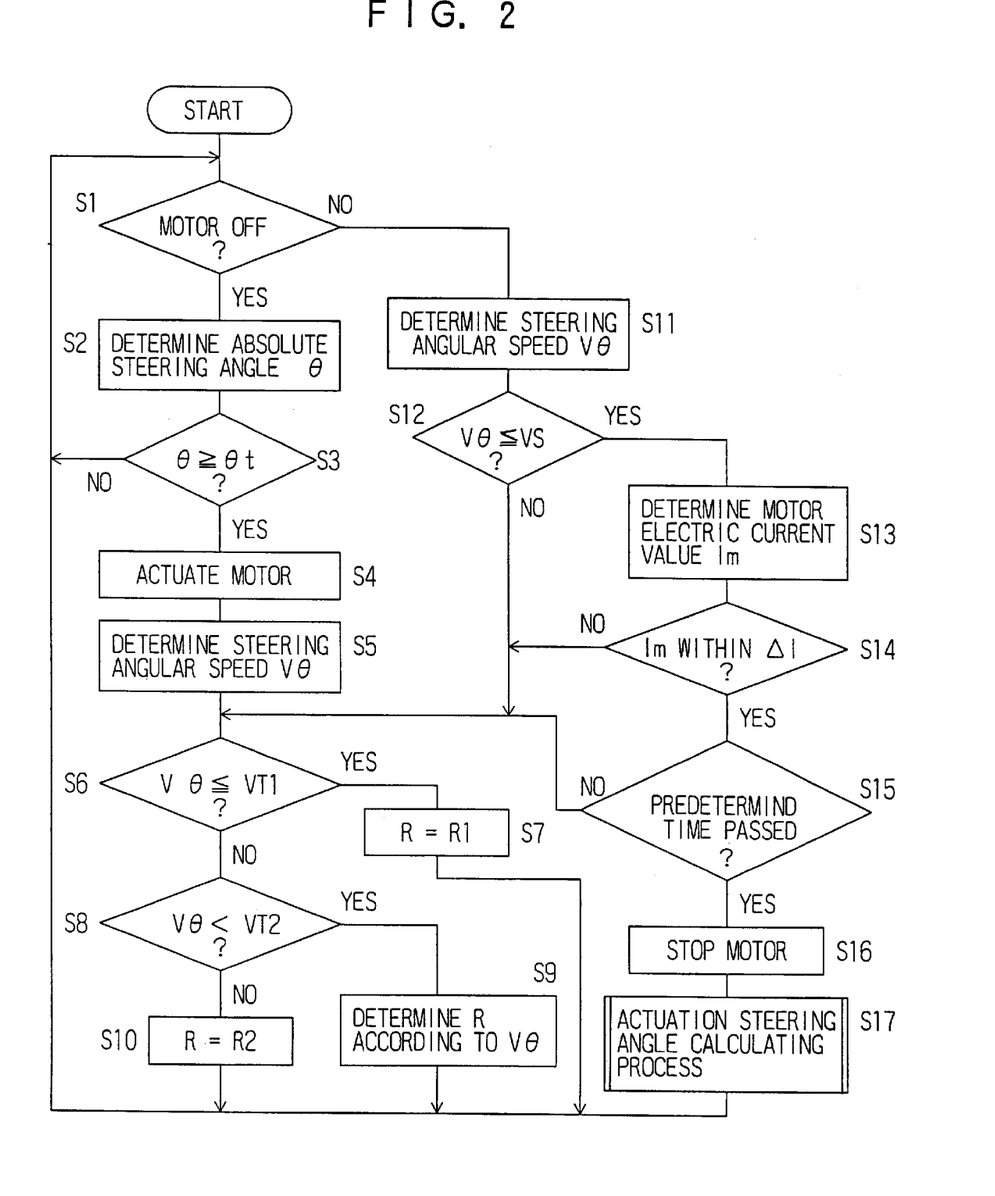
FIG. 2 is a flow chart for explaining drive control of a motor.

FIG. 2 is a flow chart for explaining the drive control of the motor 27. The CPU 31 first judges whether or not the motor 27 is off (Step Si). For this judgment, a flag may be employed, for example, which is to be set when the motor 27 is actuated and reset when the motor 27 is deactuated.

If the motor 27 is in an off state (YES in Step Si), the CPU 31 calculates an absolute steering angle $\theta$ with respect to a steering angle midpoint $\theta 0$ on the basis of the steering angle data outputted from the steering angle sensor 11 (Step S2).

The steering angle midpoint $\theta 0$ is a steering angle of the steering wheel 2 observed when the motor vehicle travels straight. The CPU 31, for example, samples steering angle data outputted from the steering angle sensor 11 after the ignition key switch is actuated, and prepares a histogram of values of the steering angle data. After a predetermined number of data are sampled, the CPU 31 determines the most frequent steering angle data, which is regarded as steering angle data corresponding to the steering angle midpoint $\theta 0$. The steering angle data of the steering angle midpoint $\theta 0$ thus determined is stored in the RAM 32. In Step S2, the CPU 31 determines the absolute steering angle $\theta$ on the basis of the steering angle data from the steering angle sensor 11 and the steering angle data of the steering angle midpoint $\theta 0$ retained in the RAM 32.

The CPU 31 further judges whether or not the absolute steering angle $\theta$ thus determined is equal to or greater than an actuation steering angle $\theta t$ stored in the RAM 32 (Step S3). The actuation steering angle $\theta t$ corresponds to an absolute steering angle of the steering wheel 2 at which the motor 27 is to be actuated. The actuation steering angle $\theta t$ has been determined, through an actuation steering angle calculating process which will be described later, on the basis of the absolute steering angle observed at previous deactuation of the motor 27, and stored in the RAM 32.

The absolute steering angle $\theta$ and the actuation steering angle $\theta t$ are each provided, for example, with a positive sign if the angle is formed on the right of the steering angle midpoint $\theta 0$ or with a negative sign if the angle is formed on the left of the steering angle midpoint $\theta 0$. Strictly speaking, the judgment in Step S3 should be performed through comparison of the absolute values of the absolute steering angle $\theta$ and the actuation steering angle $\theta t$. For simplification of explanation, it is herein assumed that the absolute steering angle $\theta$ and the actuation steering angle $\theta t$ each have a positive value.

If it is judged that the absolute steering angle $\theta$ does not reach the actuation steering angle $\theta t$ (NO in Step S3), the program returns to Step S1. On the other hand, if the absolute steering angle $\theta$ reaches the actuation steering angle $\theta t$ (YES in Step S3), the CPU 31 actuates the motor 27 (Step S4).

The rotation speed of the motor 27 is determined in accordance with a steering angular speed $V\theta$ of the steering wheel 2. More specifically, the CPU 31 determines, on the basis of the steering angle data outputted from the steering angle sensor 11, the steering angular speed $V\theta$ which is a time-related change rate of the steering angle (Step S5). The CPU 31 next judges whether or not the steering angular speed $V\theta$ thus determined is equal to or smaller than a predetermined first threshold VT1 (VT1=10 (degrees/sec)) (Step S6). If the steering angular speed $V\theta$ is equal to or smaller than the first threshold VT1 (YES in Step S6), the motor 27 is driven so that the motor rotation speed R is equated to a predetermined first rotation speed R1 (e.g., R1=1800 (rpm)) (Step S7). That is, if the steering angular speed $V\theta$ is equal to or smaller than the first threshold VT1, the motor 27 is driven constantly at the first rotation speed R1 irrespective of the value of the steering angular speed $V\theta$.

If the steering angular speed $V\theta$ exceeds the first threshold VT1 (NO in Step S6), the CPU 31 judges whether or not the steering angular speed $V\theta$ is smaller than a second threshold VT2 (e.g., VT2=600 (degrees/sec)) which is greater than the first threshold VT1 (Step S8). If the steering angular speed $V\theta$ is smaller than the second threshold VT2 (YES in Step S8), the CPU 31 drives the motor 27 at a motor rotation speed R according to the steering angular speed $V\theta$ (Step S9). That is, if the steering angular speed $V\theta$ is within a range which is greater than the first threshold VT1 and smaller than the second threshold VT2, the CPU 31 determines the motor rotation speed R so that the motor rotation speed R varies generally linearly with the steering angular speed $V\theta$ between the first rotation speed R1 and a second rotation speed R2 (R2>R1).

If the steering angular speed $V\theta$ is not smaller than the second threshold VT2 (NO in Step S8), the CPU 31 drives the motor 27 so that the motor rotation speed R is equated to the predetermined second rotation speed R2 (e.g., R2=6000 (rpm)) (Step S10). That is, if the steering angular speed $V\theta$ is not smaller than the second threshold VT2, the motor 27 is driven constantly at the second rotation speed R2 irrespective of the steering angular speed $V\theta$.

If it is judged in Step S1 that the motor 27 is driven, the CPU 31 determines the steering angular speed $V\theta$ on the basis of the steering angle data outputted from the steering angle sensor 11 (Step S11), and judges whether or not the steering angular speed Vθ thus determined is equal to or smaller than a predetermined deactuation threshold VS (e.g., VS=10 (degrees/sec)) (Step S12). If the steering angular speed Vθ exceeds the deactuation threshold VS (NO in Step S12), the program goes to Step S6, and the CPU 31 determines the motor rotation speed R on the basis of the value of the steering angular speed Vθ, and drives the motor 27 at the motor rotation speed R thus determined.

If the steering angular speed Vθ is equal to or smaller than the deactuation threshold VS (YES in Step S12), the CPU 31 determines a motor electric current level Im on the basis of the electric current data outputted from the electric current detecting circuit 12 (Step S13). Then, it is judged whether or not the motor electric current level Im thus determined is within a motor off range ΔI (Step S14). The motor off range ΔI is a range of the motor electric current level Im where no steering assist is required, and is determined through a motor off range determining process to be described later. If the motor electric current level Im is within the motor off range ΔI (YES in Step S14), the CPU 31 judges whether or not the motor electric current level Im is kept within the motor off range ΔI for a predetermined time period (e.g., 1 to 3 seconds) (Step S15). If this judgment is positive (YES in Step S15), the CPU 31 deactuates the motor 27 (Step S16) because the steering wheel 2 is considered to be virtually unoperated. Thereafter, the CPU 31 performs the actuation steering angle calculating process to determine the actuation steering angle θt (Step S17). On the other hand, if the judgment in Step S14 or S15 is negative, the CPU 31 performs the process sequence from Step S6 to determine the motor rotation speed R and drive the motor 27 at the rotation speed thus determined.

Figure 3:
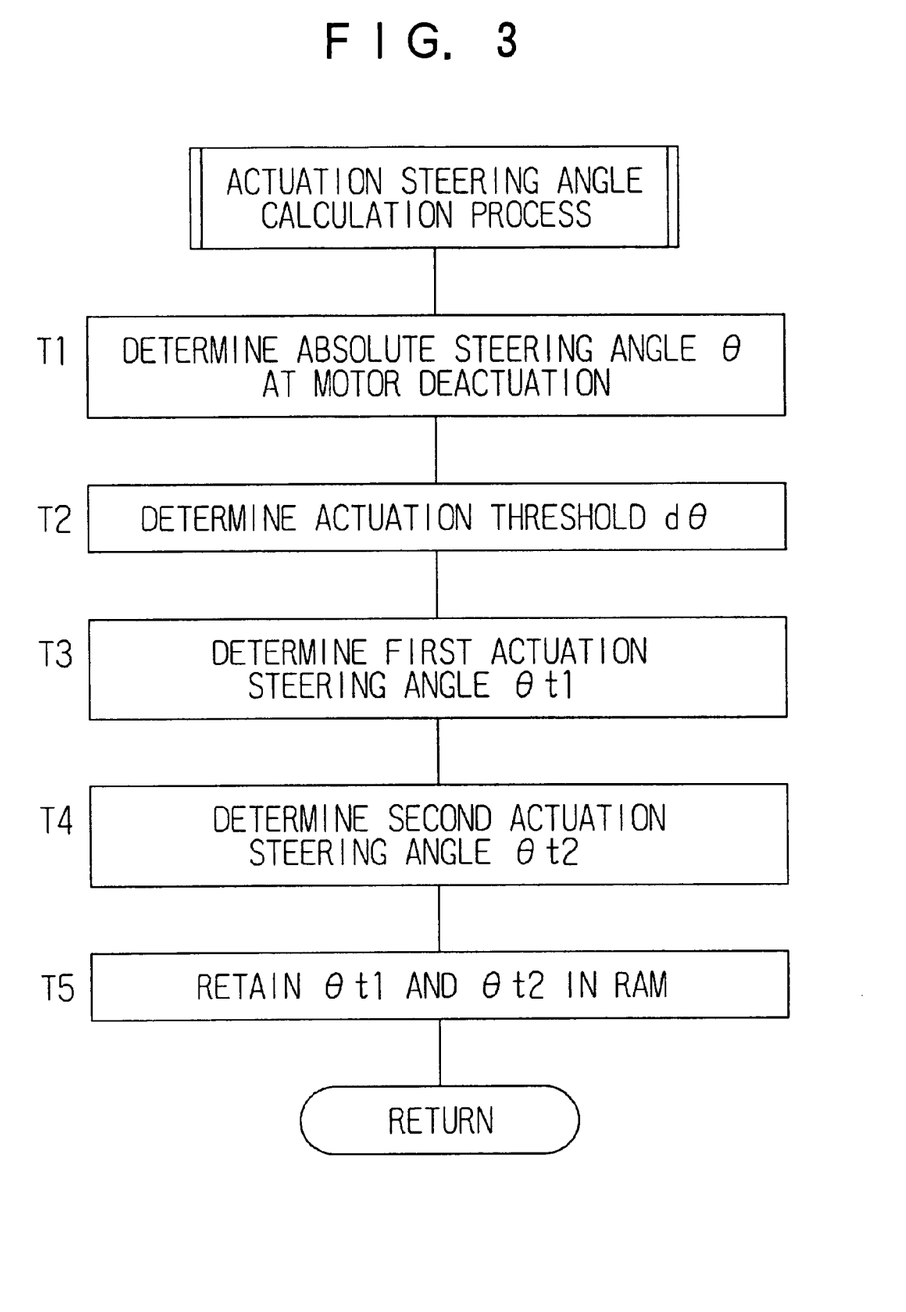
FIG. 3 is a flow chart showing an actuation steering angle calculating process for determining an actuation steering angle.

FIG. 3 is a flow chart showing the actuation steering angle calculating process. The CPU 31 determines the absolute steering angle θ at the deactuation of the motor 27 on the basis of the steering angle data outputted from the steering angle sensor 11 (Step T1). Then, the CPU 31 obtains a vehicle speed V on the basis of the vehicle speed data outputted from the vehicle speed sensor 13, and determines an actuation threshold dθ according to the vehicle speed V (Step T2). The actuation threshold dθ corresponds to a change amount of the steering angle which serves as a trigger for the actuation of the motor 27. That is, the motor 27 is actuated when the change amount of the steering angle reaches the actuation threshold dθ. In this embodiment, the actuation threshold dθ has a positive value when the steering wheel is turned right, and has a negative value when the steering wheel is turned left.

More specifically, the actuation threshold dθ is obtained by substituting into the following equation (+R), (+L), (−R) or (−L) a first constant A and a second constant B for the obtained vehicle speed V. Where the steering wheel which is being turned to the right (with a positive absolute steering angle θ at the motor deactuation) is further turned right (or is operated away from the steering angle midpoint θ0), the equation (+R) is employed for determination of the first actuation threshold dθ1 and, where the steering wheel being turned to the right is turned left (or operated toward the steering angle midpoint θ0), the equation (+L) is employed for determination of the second actuation threshold dθ2. On the other hand, where the steering wheel which is being turned to the left (with a negative absolute steering angle θ at the motor deactuation) is further turned left (or is operated away from the steering angle midpoint θ0), the equation (−L) is employed for determination of the first actuation threshold dθ1 and, where the steering wheel being turned to the left is turned right (or operated toward the steering angle midpoint θ0), the equation (−R) is employed for determination of the second actuation threshold dq2.

For positive steering angle θ
  Right-turn steering operation (away from the midpoint)

$$d\theta 1 = A - (\theta/B) \ldots (+R)$$

Left-turn steering operation (toward the midpoint)

$$d\theta 2 = -A - (\theta/B) \ldots (+L)$$

For negative steering angle θ
  Left-turn steering operation (away from the midpoint)

$$d\theta 1 = -A + (\theta/B) \ldots (-L)$$

Right-turn steering operation (toward the midpoint)

$$d\theta 2 = A + (\theta/B) \ldots (-R)$$

The first constant A and the second constant B are factors for determining a sensitivity for the actuation of the motor 27, and a table indicative of a correlation between the vehicle speed V and the constants A and B is preliminarily stored in the ROM 33. The constant A is the maximum absolute value of the actuation threshold dθ (dθ1 or dθ2), and the constant B corresponds to the number of steering angle values for which the same actuation threshold dθ is employed.

Where the steering angle sensor 11 is adapted to output a pulse for every turn by a given steering angle, for example, the steering angle θ may be expressed by the count value of a counter which is counted up or down by the pulse output. In such a case, the constant B may correspond to the number of count values for which the same actuation threshold dθ is employed. It is noted that the constants A and B each have a positive value.

The maximum absolute value A or −A of the actuation threshold dθ is the absolute value of an actuation threshold dθ at θ=0, i.e., an actuation threshold as defined with respect to the steering angle midpoint.

As apparent from the equations (+R), (+L), (−L) and (−R), the actuation steering angles for the steering operation away from the midpoint and for the steering operation toward the midpoint are different by 2A (=|dθ1−dθ2|). That is, the difference between the actuation steering angles for the steering operation away from the midpoint and for the steering operation toward the midpoint is virtually constant irrespective of the steering angle θ.

The first actuation threshold dθ1 to be employed for the steering operation away from the midpoint during which the steering wheel is operated in such a direction that the absolute value of the absolute steering angle θ is increased has a smaller absolute value, as the absolute value of the absolute steering angle θ increases. On the other hand, the second actuation threshold dθ2 to be employed for the steering operation toward the midpoint during which the steering wheel is operated in such a direction that the absolute value of the absolute steering angle θ is reduced has a greater absolute value, as the absolute value of the absolute steering angle θ increases.

When the vehicle speed V is when zero, that is the vehicle stops, the actuation threshold dθ is not determined on the basis of any of the above equations (+R), (+L), (−R) and (−L) but set at a predetermined minimum actuation threshold.

The CPU 31 determines a first actuation steering angle θt1 by adding the first actuation threshold dθ1 to the absolute steering angle θ at the motor deactuation (Step T3). The first actuation steering angle θt1 is an absolute steering angle at which the motor 27 is to be actuated when the steering wheel 2 is operated away from the midpoint with the motor 27 being off.

The CPU 31 determines a second actuation steering angle θt2 by adding the second actuation threshold dθ2 to the absolute steering angle θ at the motor deactuation (Step T4). The second actuation steering angle θt2 is an absolute steering angle at which the motor 27 is to be actuated when the steering wheel 2 is operated toward the midpoint with the motor 27 being off.

The CPU 31 stores the first actuation steering angle θt1 and the second actuation steering angle θt2 thus determined in the RAM 32 (Step T5).

In FIG. 2, the first actuation steering angle θt1 and the second actuation steering angle θt2 are generally designated as the actuation steering angle θt.

Figure 4A:
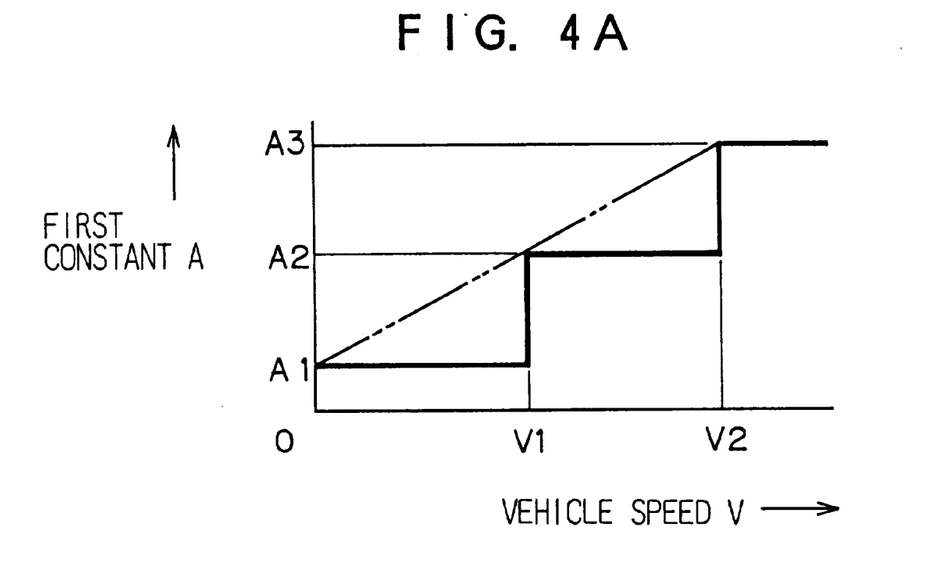
FIGS. 4A and 4B are diagrams for explaining exemplary setting of first and second constants.

FIGS. 4A and 4B are diagrams for explaining the first constant A and the second constant B. The first constant A is determined for each predetermined vehicle speed range, and corresponds to the maximum value of the actuation threshold dθ to be determined for the corresponding vehicle speed range. More specifically, as shown in FIG. 4A, where the vehicle speed V is lower than V1 (e.g., V1=30 (km/h)), the first constant A is set at A1 (e.g., A1=1). Where the vehicle speed V is not lower than V1 and lower than V2 (e.g., V2=60 (km/h)), the first constant A is set at A2 (e.g., A2=3). Further, where the vehicle speed V is not lower than V2, the first constant A is set at A3 (e.g., A3=6).

Figure 4B:
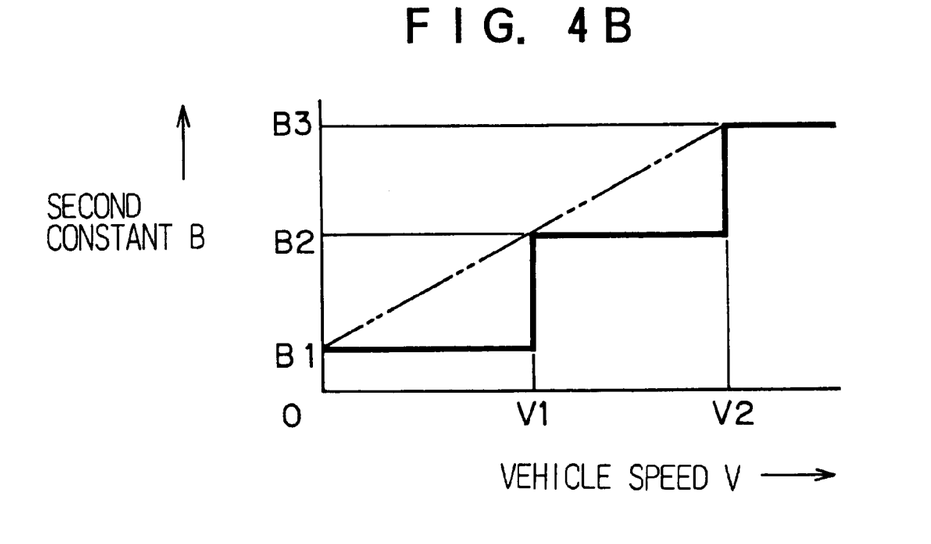

The second constant B is determined for each predetermined vehicle speed range, and corresponds to the number of the absolute steering angle values which take the same actuation threshold dθ for the corresponding vehicle speed range. More specifically, as shown in FIG. 4B, where the vehicle speed V is lower than V1, the second constant B is set at B1 (e.g., B1=1). Where the vehicle speed V is not lower than V1 and lower than V2, the second constant B is set at B2 (e.g., B2=2). Further, where the vehicle speed V is not lower than V2, the second constant B is set at B3 (e.g., B3=3).

The first constant A and the second constant B are not necessarily set in a stepwise form as shown in FIGS. 4A and 4B, but may be set as being linearly variable as indicated by two-dot-and-dash lines, for example, when the vehicle speed V is lower than V2.

The absolute value of the actuation threshold dθ is set greater for a higher vehicle speed by setting the first constant A greater for a higher vehicle speed. Further, the decrease rate of the absolute value of the actuation threshold dθ with an increase in the absolute value of the absolute steering angle θ at the motor deactuation is reduced by setting the second constant B greater for a higher vehicle speed. Therefore, even if the absolute value of the absolute steering angle θ at the motor deactuation is relatively great, a substantial change in the steering angle is required for the actuation of the motor 27. Thus, needless motor actuation is prevented when the vehicle speed is high. When the vehicle speed is low, the actuation sensitivity is increased, so that a steering assist force can immediately be generated.

Figure 5:
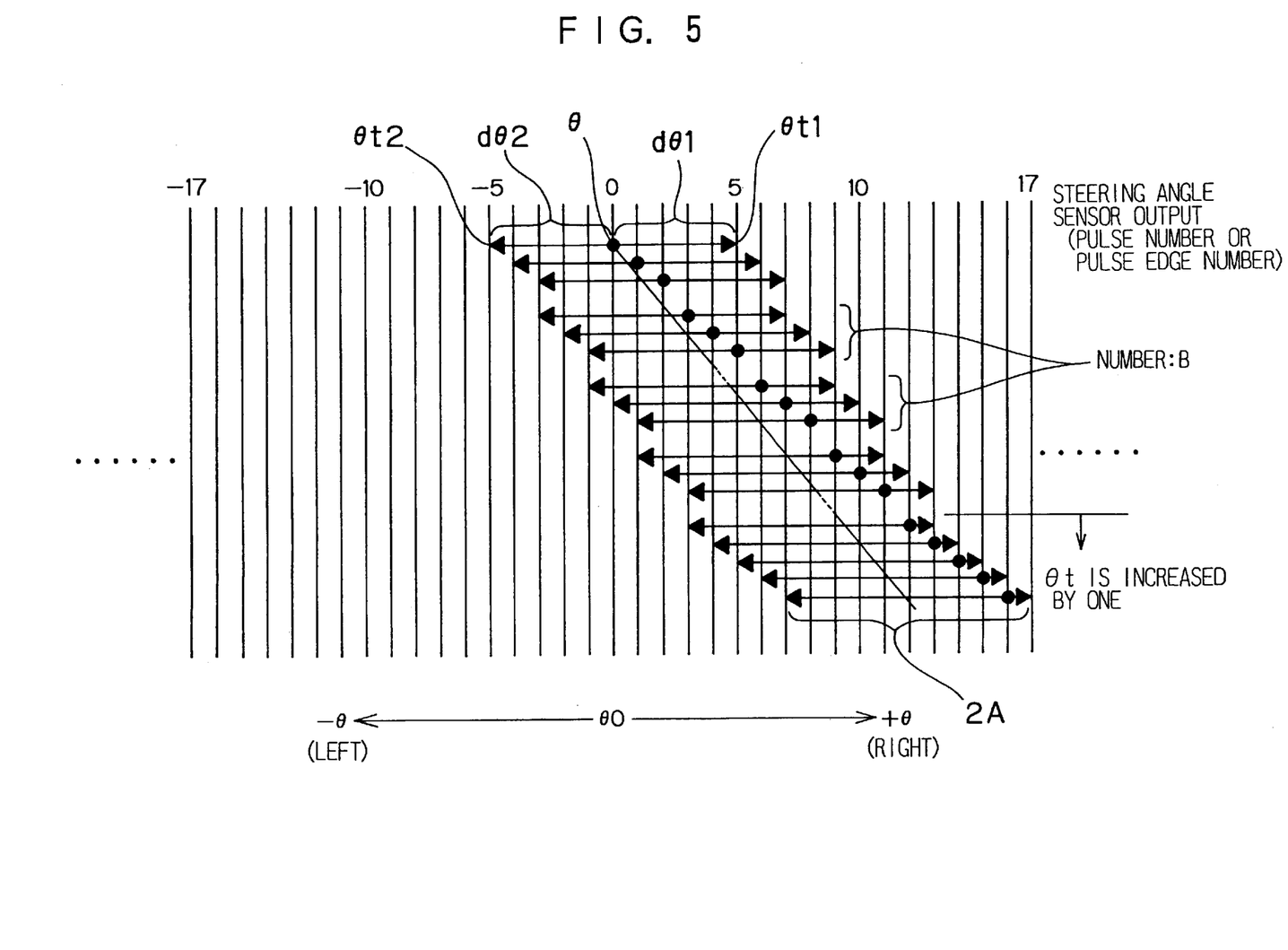
FIG. 5 is a diagram showing a relationship between the steering angle and the actuation steering angle observed when the steering angle at deactuation of the motor is positive.
Figure 6:
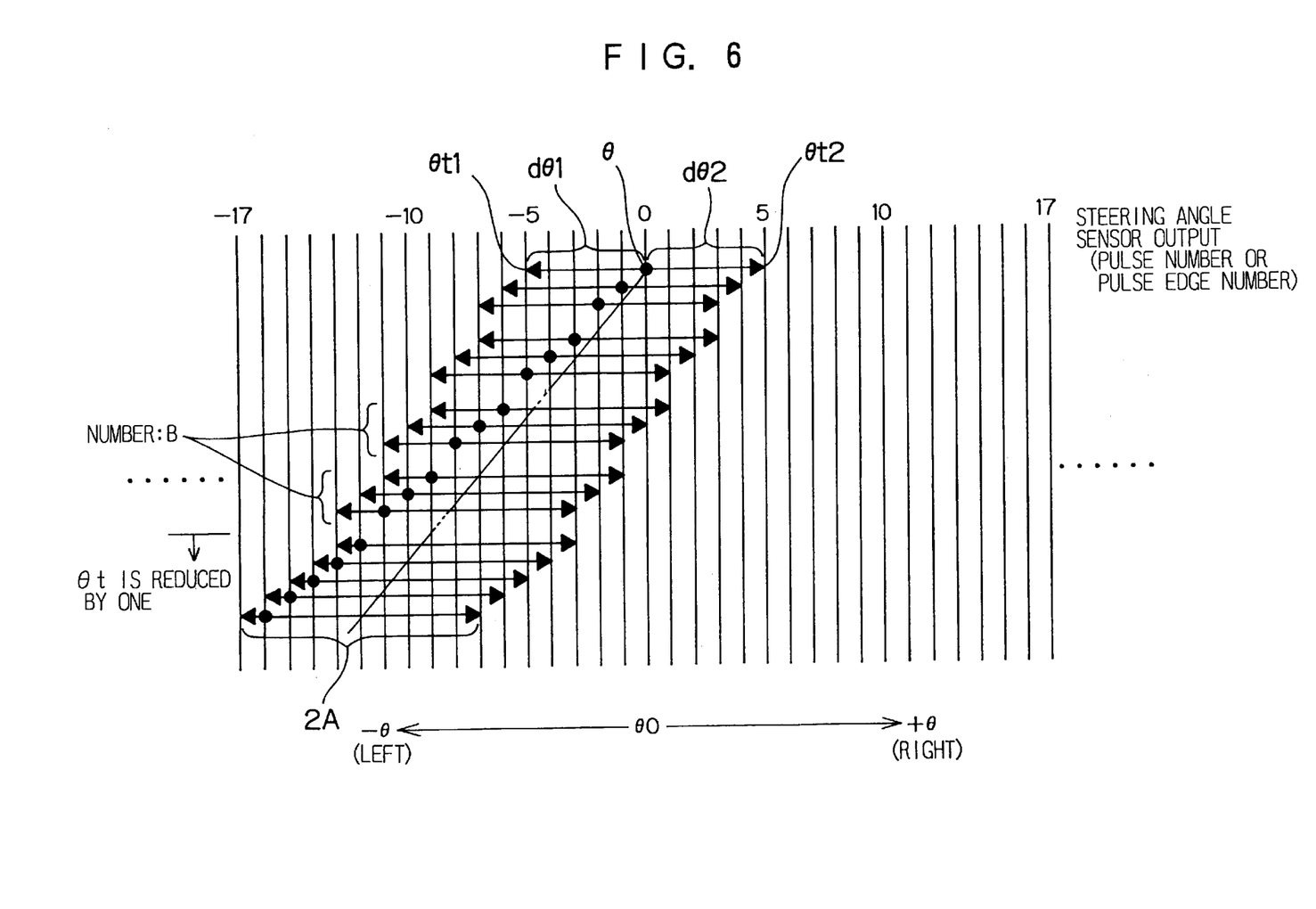
FIG. 6 is a diagram showing a relationship between the steering angle and the actuation steering angle observed when the steering angle at the motor deactuation is negative.

FIGS. 5 and 6 are diagrams showing relationships between the absolute steering angle θ and the actuation steering angle θt, particularly, relationships existing between the absolute steering angle θ and the actuation steering angle θt when the first constant A and the second constant B are "5" and "3", respectively. FIG. 5 shows a case where the absolute steering angle θ at the motor deactuation is positive, and FIG. 6 shows a case where the absolute steering angle θ at the motor deactuation is negative.

In FIGS. 5 and 6, the absolute steering angle θ at the motor deactuation is represented by a symbol "●", the actuation threshold dθ (dθ1 or dθ2) is represented by the length of an arrow extending from the symbol "●", and the actuation steering angle θt (θt1 or θt2) is represented by the head of the arrow. Further, vertical lines represent absolute steering angles θ.

As apparent from FIGS. 5 and 6, the absolute value of the first actuation threshold dθ1 for the steering operation away from the midpoint decreases as the absolute value of the absolute steering angle θ at the motor deactuation increases. That is, the sensitivity for the actuation of the motor 27 becomes higher as the absolute value of the absolute steering angle θ at the motor deactuation becomes greater. This is based on the following ground.

Where the absolute steering angle θ has a value close to the steering angle midpoint θ0, the steering assist is necessary only when the steering wheel 2 is operated to get out of the play angle range of the steering wheel 2. Therefore, when the absolute steering angle θ is close to the steering angle midpoint θ0, excessive steering assist can be suppressed by setting the first actuation threshold dθ1 greater, so that the energy saving can be enhanced. On the contrary, when the absolute steering angle θ has a great value, a satisfactory steering feeling can be ensured by immediately providing the steering assist.

As also apparent from FIGS. 5 and 6, the absolute value of the second actuation threshold dθ2 for the steering operation toward the midpoint increases, as the absolute value of the absolute steering angle θ at the motor deactuation increases. That is, the motor actuation sensitivity becomes higher, as the absolute value of the absolute steering angle θ at the motor deactuation becomes smaller. This is based on the following ground.

When the vehicle is traveling with the steering wheel being turned, a self-alignment force is exerted on the steering mechanism due to a reverse input from the wheels to return the steering wheel 2 to the steering angle midpoint θ0. The self-alignment force is small when the steering angle is close to the steering angle midpoint θ0. The greater the steering angle, the greater the alignment force. Therefore, when the steering angle is large, the steering assist is less necessary for the steering operation toward the midpoint θ0. Conversely, when the steering angle is small, the steering assist is immediately required. Thus, the energy saving can be enhanced by efficiently utilizing the self-alignment force and, at the same time, the steering feeling can be improved for the driver.

The difference between the actuation steering angle θt1 for the steering operation away from the midpoint and the actuation steering angle θt2 for the steering operation toward the midpoint is kept at a constant value "2A". Thus, a range in which the torque applied to the torsion bar 9 is small is defined as a dead zone to prevent the motor 27 from being actuated in an excessively sensitive manner.

Relationships between the absolute steering angle θ the motor deactuation and a steering angle of the steering wheel 2 in a neutral state where virtually no torsion is applied to the torsion bar 9 are indicated by two-dot-and-dash lines in FIGS. 5 and 6. As can be understood from these relationships, the torque applied to the steering wheel 2 is small in a steering angle range between the actuation steering angle θt1 for the steering operation away from the midpoint and the actuation steering angle θt2 for the steering operation toward the midpoint. Therefore, the torsion applied to the torsion bar 9 is small, so that the steering assist is not required.

Figure 7:
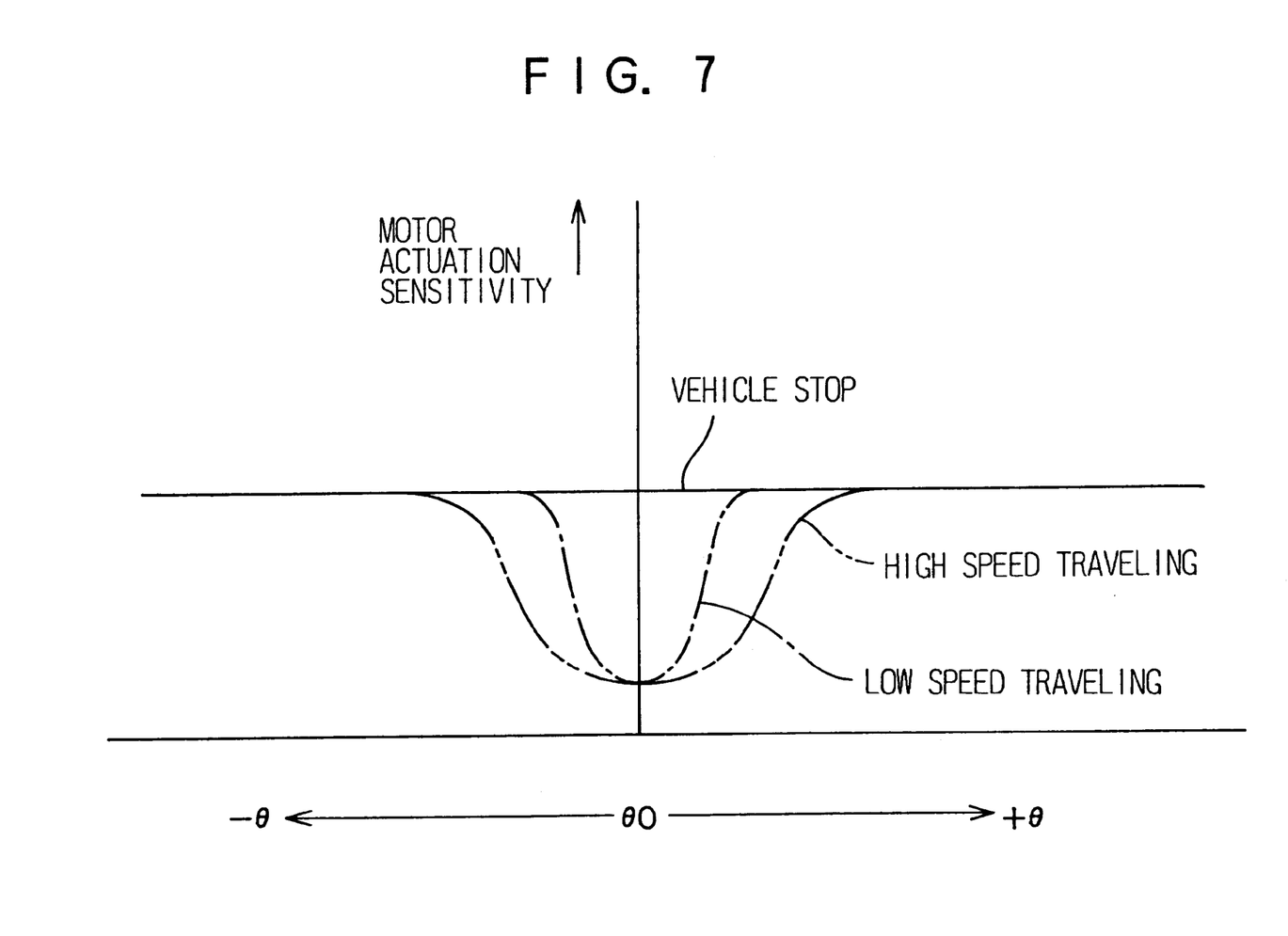
FIG. 7 is a diagram for explaining a relationship between the motor actuation sensitivity and the vehicle speed.

FIG. 7 is a diagram for explaining a relationship between the sensitivity for the actuation of the motor 27 (which becomes higher as the absolute value of the actuation threshold d$\theta$ decreases) and the vehicle speed V. As apparent from FIG. 7, the sensitivity for the actuation of the motor 27 varies depending upon the vehicle speed V, even if the absolute steering angle $\theta$ at the motor deactuation is at the same value. More specifically, the sensitivity for the actuation of the motor 27 is low at high speed traveling, and high at low speed traveling. This is because little steering assist force is required at the high speed traveling and the steering assist should immediately be provided at the low speed traveling.

When the motor vehicle stops with a vehicle speed V of zero, the actuation threshold d$\theta$ is set at the predetermined minimum value as described above, so that the sensitivity for the actuation of the motor 27 is kept constant irrespective of the value of the absolute steering angle $\theta$. Where a so-called parking steering operation is performed when the vehicle stops, a greater steering assist force is required and, therefore, it is preferred that the steering assist is immediately provided irrespective of the value of the absolute steering angle $\theta$.

Figure 8:
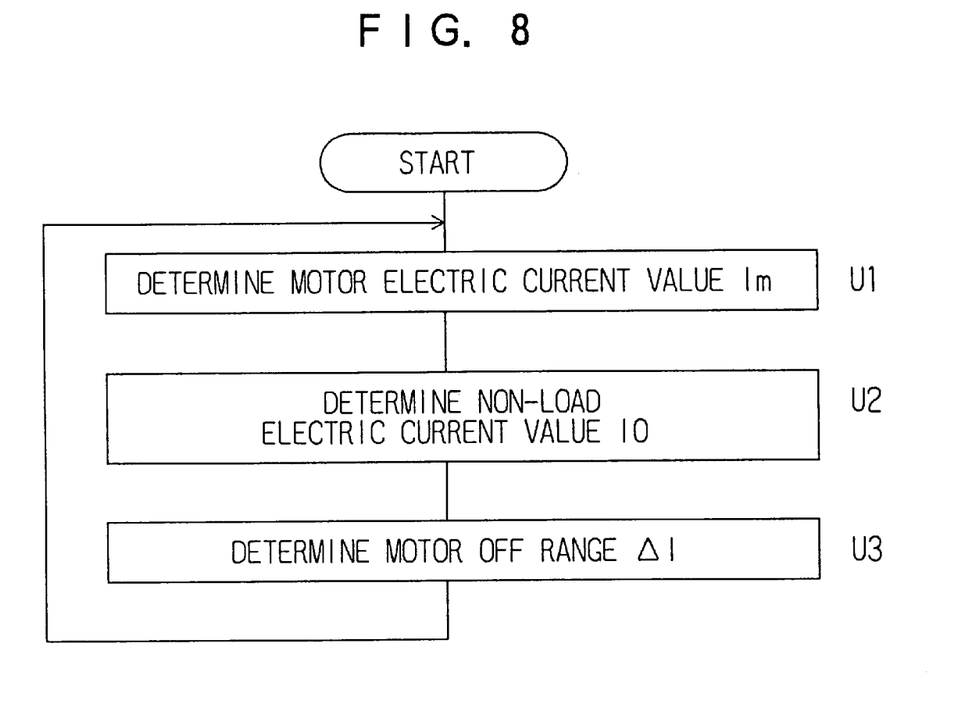
FIG. 8 is a flow chart for explaining a motor off range determining process.

FIG. 8 is a flow chart for explaining the motor off range $\Delta$I determining process. The CPU 31 constantly monitors the motor electric current value Im (Step U1). On the basis of the motor electric current value Im, the CPU 31 determines a non-load electric current value I0 which corresponds to a motor electric current value observed when the motor 27 is in a non-load state (Step U2). Using the non-load electric current value I0 thus determined, the CPU 31 determines the motor off range $\Delta$I (Step U3). More specifically, the CPU 31 determines as the motor off range $\Delta$I a range defined between the non-load electric current value I0 thus determined and a value I0+dI resulting from summation of the non-load electric current value I0 and an electric current threshold dI which is predetermined in accordance with the specifications of the motor vehicle.

Figure 9:
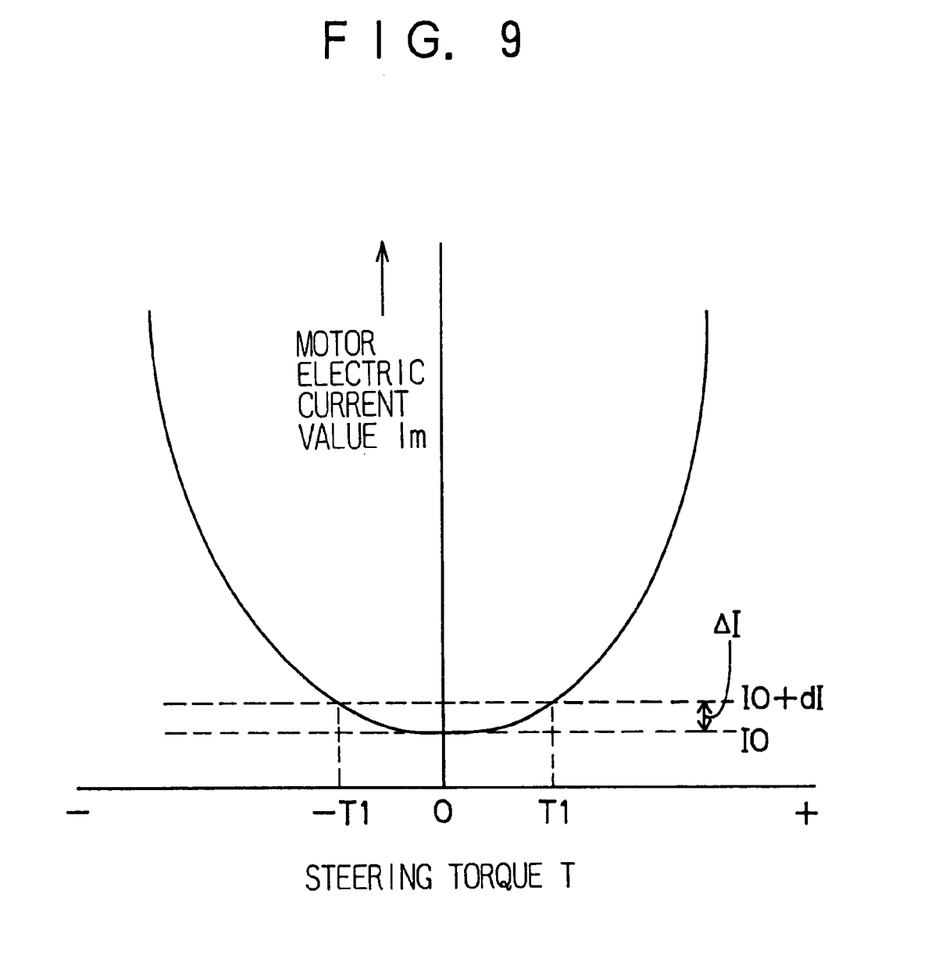
FIG. 9 is a graph showing a relationship between the motor electric current and the steering torque.

FIG. 9 is a graph showing a relationship between the steering torque T and the motor electric current value Im. The abscissa and the ordinate represent the steering torque T and the motor electric current value Im, respectively. The motor electric current value Im in a range around a steering torque T of zero is expressed by a curve having a vertex at T=0. When the steering torque T is zero, the motor 27 is in the non-load state and, therefore, the minimum value of the motor electric current value Im corresponds to the non-load electric current value I0.

On the other hand, a torque range where no steering assist force is required to be applied to the steering wheel 2 is determined by the specifications of the motor vehicle. Provided that the torque range is defined between torque thresholds T1 and −T1 with its midpoint set at zero, a difference between the non-load electric current value I0 and an electric current value for these torque thresholds T1, −T1 is preliminarily determined which is employed as the electric current threshold dI. The range defined between the non-load electric current value I0 and the value I0+dI obtained by adding the electric current threshold dI to the non-load electric current value I0 is considered to be the motor off range $\Delta$I where the steering wheel 2 is not operated. The electric current threshold dI is preliminarily determined for each type of motor vehicles, and stored in the ROM 33.

The non-load electric current value I0 varies mainly depending on the temperature of the working oil. More specifically, when the temperature of the working oil is low, for example, the working oil has a high viscosity, so that the load on the motor 27 is greater than when the temperature of the working oil is high. Therefore, the motor electric current value Im is high when the temperature of the working oil is low. That is, the Im-T curve in FIG. 9 is shifted upward with the non-load electric current value I0 being increased.

In this embodiment, therefore, the non-load electric current value I0 is calculated, and the range between the calculated non-load electric current value I0 and the value I0+dI resulting from the summation of the non-load electric current value I0 and the electric current threshold dI stored in the ROM 33 is defined as the motor off range $\Delta$I.

The calculation of the non-load electric current value I0 is achieved, for example, by determining the most frequent electric current value out of sampled motor electric current values Im. More specifically, the CPU 31 samples electric current data outputted from the electric current detecting circuit 12 over a predetermined time period (e.g., 10 (min) to 1 (hour)) on condition that the motor rotation speed R is kept constant and the steering wheel 2 is not operated. The motor electric current values Im determined on the basis of the electric current data obtained through the sampling have a normal distribution. In this case, a motor electric current value Im at a steering torque of zero is the most frequent electric current value, which is employed as the non-load electric current value I0.

Otherwise, the minimum electric current value, which is determined out of motor electric current values Im sampled by a predetermined number of times or during a predetermined time period on condition that the motor rotation speed R is kept constant and the steering wheel 2 is not operated, may be employed as the non-load electric current value I0.

In accordance with the embodiment described above, the sensitivity for the actuation of the motor 27 with respect to a change in the steering angle is increased in the steering operation away from the steering angle midpoint $\theta$0, as the absolute value of the absolute steering angle $\theta$ at the motor deactuation increases. Therefore, needless motor actuation can be suppressed when the steering angle is close to the steering angle midpoint $\theta$0. In addition, when the steering angle $\theta$ is large, a steering assist force can immediately be generated. Thus, the energy saving can be enhanced, and an entrapped feeling can be eliminated.

In the steering operation toward the steering angle midpoint $\theta$0, the sensitivity for the actuation of the motor 27 with respect to a change in the steering angle is reduced, as the absolute value of the absolute steering angle $\theta$ at the motor deactuation increases. Therefore, needless motor actuation can be suppressed by effectively utilizing the self-alignment force when the absolute steering angle $\theta$ is large, so that the energy saving can be enhanced. Where the steering wheel is operated toward the steering angle midpoint $\theta$0 when the steering angle is close to the steering angle midpoint $\theta$0, the steering assist is provided relatively quickly, so that a satisfactory steering feeling can be ensured.

Further, the sensitivity for the actuation of the motor 27 is increased at the low speed traveling which requires a greater steering assist force, while the actuation sensitivity is reduced at the high speed traveling. Hence, the enhancement of the energy saving and the improvement of the steering feeling can both be ensured.

While the present invention has thus been described in detail by way of the embodiment thereof, it should be understood that the foregoing disclosure is merely illustrative of the technical principles of the present invention but not limitative of the same. The spirit and scope of the present invention are to be limited only by the appended claims.

This application claims priority benefits under the Convention on the basis of Japanese Patent Application No. 10-265215 filed to the Japanese Patent Office on Sep. 18, 1998.

What is claimed is:

1. A power steering apparatus for generating a steering assist force by a hydraulic pressure generated by a pump driven by an electric motor, the power steering apparatus comprising:

a steering angle detector for sensing a steering angle as measured with respect to a steering angle midpoint;

an actuation control circuit for actuating the electric motor in its off state, on condition that a change amount of the steering angle sensed by the steering angle detector exceeds a predetermined actuation threshold; and an actuation threshold determining circuit for determining the actuation threshold in accordance with the steering angle sensed by the steering angle detector at which the electric motor is deactuated, the actuation threshold determining circuit being adapted to determine a first actuation threshold which is to be employed when a steering wheel is operated away from the steering angle midpoint and a second actuation threshold which is to be employed when the steering wheel is operated toward the steering angle midpoint in accordance with the sensed steering angle so that a sum of the first and second actuation thresholds is virtually constant.

2. A power steering apparatus as set forth in claim 1, wherein the actuation threshold determining circuit sets the first actuation threshold to be employed for the steering operation away from the midpoint at a lower value and the second actuation threshold to be employed for the steering operation toward the midpoint at a higher value, as the steering angle sensed by the steering angle detector at the motor deactuation is greater.

3. A power steering apparatus as set forth in claim 1, further comprising a vehicle speed sensor for sensing a vehicle speed, wherein the actuation threshold determining circuit sets the actuation threshold at a higher value, as the vehicle speed sensed by the vehicle speed sensor is higher.

4. A power steering apparatus as set forth in claim 1, wherein the actuation control circuit comprises:

an actuation steering angle calculating circuit for determining an actuation steering angle at which the electric motor in an off state is to be actuated on the basis of the steering angle sensed by the steering angle detector and the actuation threshold determined by the actuation threshold determining circuit; and a circuit for actuating the electric motor in its off state, on condition that the steering angle sensed by the steering angle detector reaches the actuation steering angle determined by the actuation steering angle calculating circuit.

5. A power steering apparatus for generating a steering assist force by a hydraulic pressure generated by a pump driven by an electric motor, the power steering apparatus comprising:

a steering angle detector for sensing a steering angle as measured with respect to a steering angle midpoint;

an actuation control circuit for actuating the electric motor in an off state, on condition that a change amount of the steering angle sensed by the steering angle detector exceeds a predetermined actuation threshold; and an actuation threshold determining circuit for determining the actuation threshold in accordance with the steering angle sensed by the steering angle detector at which the electric motor is deactuated, the actuation threshold determining circuit being adapted to set at a higher value the actuation threshold which is to be employed when a steering wheel is operated toward the steering angle midpoint, as the steering angle sensed by the steering angle detector at the motor deactuation is greater.

* * * * *